US006924615B2

(12) United States Patent

Cavarec et al.

(10) Patent No.: US 6,924,615 B2

(45) Date of Patent: Aug. 2, 2005

(54) MAGNETIC ENCODER FOR POWERED WINDOW COVERING

(75) Inventors: Pierre-Emmanuel Cavarec, San Diego, CA (US); Winston Glenn Walker, Littleton, CO (US)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 10/699,108

(22) Filed: Oct. 31, 2003

(65) Prior Publication Data

US 2004/0090201 A1 May 13, 2004

Related U.S. Application Data

(63) Continuation-in-part of application No. 10/460,596, filed on Jun. 11, 2003, now Pat. No. 6,870,338, and a continuation-in-part of application No. 10/062,895, filed on Feb. 1, 2002, and a continuation-in-part of application No. 10/272,640, filed on Oct. 16, 2002.

(51) Int. Cl.[7] .................................................. H02P 3/00

(52) U.S. Cl. ....................... 318/466; 318/468; 318/264; 318/265; 318/266; 310/68 B; 310/77; 310/152; 310/154; 310/156

(58) Field of Search ................................ 318/466, 467, 318/468, 264, 265, 266; 310/68 B, 77, 152, 154, 156

(56) References Cited

U.S. PATENT DOCUMENTS

| | | | | |
|---|---|---|---|---|
| 3,352,349 A | | 11/1967 | Hennequin | 160/171 |
| 4,522,244 A | | 6/1985 | Brolin | 160/170 |
| 4,623,012 A | | 11/1986 | Rude et al. | 160/243 |
| 4,651,940 A | * | 3/1987 | Nakamura | 242/390.1 |
| 5,164,896 A | * | 11/1992 | Nagayasu | 700/61 |
| 5,184,660 A | | 2/1993 | Jelic | 160/171 |
| 5,228,491 A | | 7/1993 | Rude et al. | 160/171 |
| 5,228,492 A | * | 7/1993 | Jou | 160/188 |
| 5,540,269 A | * | 7/1996 | Plumer | 160/3 |
| 5,760,558 A | * | 6/1998 | Popat | 318/480 |
| 5,793,174 A | * | 8/1998 | Kovach et al. | 318/468 |
| 5,848,634 A | * | 12/1998 | Will et al. | 160/310 |
| 6,169,349 B1 | * | 1/2001 | Davenport | 310/114 |
| 6,181,089 B1 | * | 1/2001 | Kovach et al. | 318/16 |

FOREIGN PATENT DOCUMENTS

| | | | |
|---|---|---|---|
| DE | 29509638 U1 | 11/1996 | E05F/15/10 |
| EP | 0381643 A1 | 8/1990 | E06B/9/82 |
| EP | 0859224 A2 | 8/1998 | G01L/3/14 |
| JP | 29028 | 2/1983 | 1/66 |
| JP | 109484 | 6/1985 | 9/32 |
| JP | 192987 | 8/1989 | 9/32 |
| JP | 363495 | 12/1992 | 9/264 |

* cited by examiner

*Primary Examiner*—Rita Leykin
(74) *Attorney, Agent, or Firm*—John L. Rogitz

(57) ABSTRACT

A motor for turning the rod of an object such as a window covering is attached to an elongated ferromagnetic bar. Magnets are closely spaced from the bar, and as the bar rotates to cut the magnetic field lines, pickup coils generate signals that can be used to determine the direction and speed of rotation and also the position of the motor (and, hence, the position of the object being moved). The magnets brake the motor from turning under the weight of the object when the motor is deenergized.

23 Claims, 3 Drawing Sheets

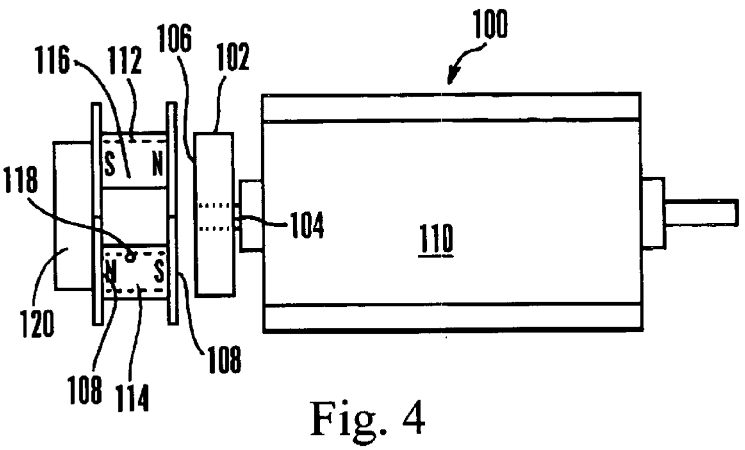
Fig. 4
Fig. 5
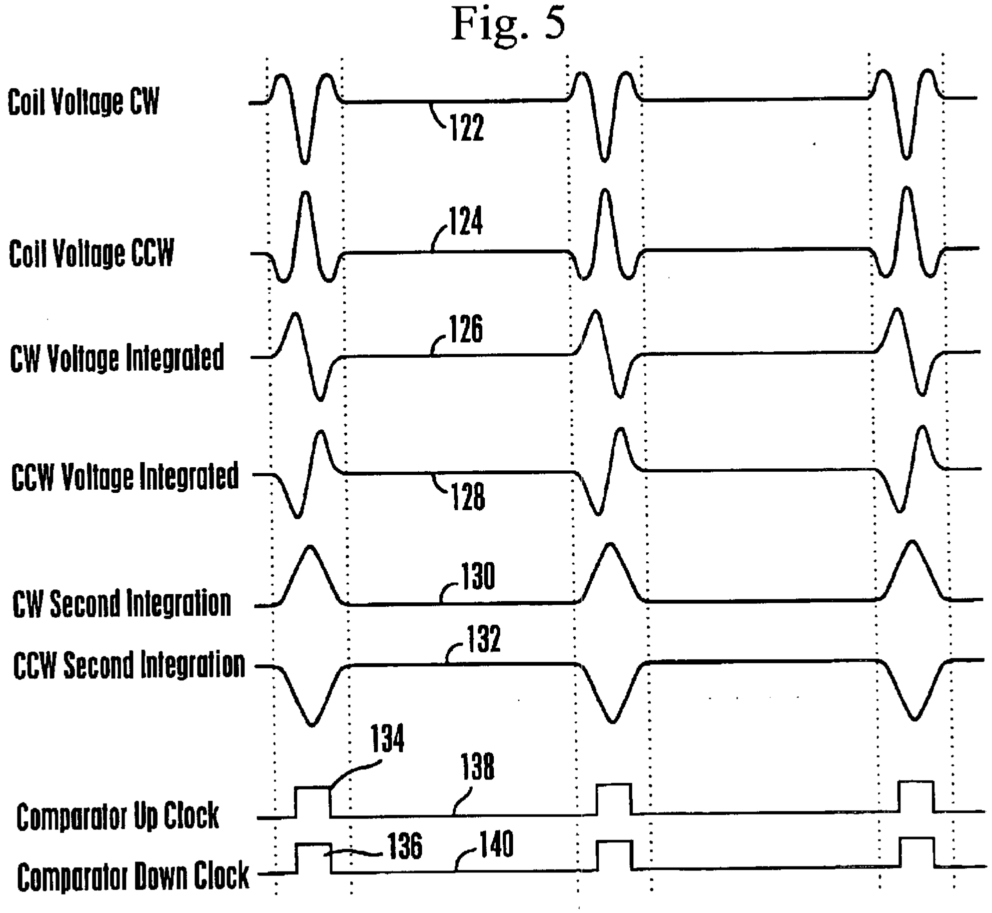

MAGNETIC ENCODER FOR POWERED WINDOW COVERING

RELATED APPLICATIONS

The present application is a continuation in part of and claims priority from U.S. patent application Ser. No. 10/460,596, filed Jun. 11, 2003 now U.S. Pat. No. 6,870,338; Ser. No. 10/062,895, filed Feb. 1, 2002; and Ser. No. 10/272,640, filed Oct. 16, 2002, all of which are incorporated herein by reference.

I. FIELD OF THE INVENTION

The present invention relates generally to motorized window coverings, awnings, security screens, projection screens, and the like.

II. BACKGROUND OF THE INVENTION

The present assignee has provided several systems for either lowering or raising a window covering, or for moving the slats of a window covering between open and closed positions, under control of a hand-held remote or other control device. These systems include a motor that is coupled through gears to the window covering activation mechanism. When the motor is energized in response to a user command signal, the activation mechanism moves the window covering. Such assemblies are disclosed in U.S. Pat. No. 6,433,498, incorporated herein by reference.

The parent applications provide inventions for determining the position of the window coverings based on counting motor pulses, and for braking the motor from turning when it is not energized. By knowing the position of the window coverings, features such as automatic repositioning the window covering to a preset position can be provided. The present invention likewise provides structure and methods for determining not only the position of an object such as a window covering, projector screen, awning, and the like being driven by a motor, but also under some circumstances the speed and direction of rotation of the motor.

SUMMARY OF THE INVENTION

A powered assembly includes an object that can be moved between a first configuration and a second configuration. The object is selected from the group consisting of window coverings, awnings, skylight coverings, curtains, and screens. The assembly includes a motor and an actuator coupled to the motor and the object to move the object when the motor is energized. A rotating member such as an elongated bar is engaged with the motor, and plural permanent magnets are juxtaposed with the rotating member and are magnetically coupled thereto to output signals when the motor rotates. At least one north pole and at least one south pole may be adjacent the rotating member. The signals are useful in determining at least one of: a position, an angular velocity, and a direction of rotation, of the rotating member. Moreover, the magnets magnetically brake the motor from turning when the motor is deenergized.

At least one pickup coil can be juxtaposed with the rotating member for generating pulses as the rotating member rotates past the magnets. The motor may be powered by at least one dc battery, i.e., one or more electrochemical cells.

In a non-limiting embodiment the rotating member includes an elongated ferromagnetic element coupled to a rotor of the motor to rotate when the rotor rotates. In one implementation, the ferromagnetic element rotates in a plane and the magnets are closely spaced from the plane. In this embodiment, two bobbins may be provided each of which holds two magnets in close juxtaposition with the ferromagnetic element. The bobbins are can be oriented in tandem with each other. Wire is wound around each respective bobbin to establish respective pickup coils, with the pickup coils being connected together in series. In another implementation, the ferromagnetic element rotates in a plane and at least some magnets are disposed in the plane. In another implementation, a single coil and bobbin may be provided, with the bobbin holding two magnets and its coil providing the necessary signals.

In another aspect, a drive assembly for a movable object including a rod includes an electrically-powered drive structure couplable to the rod to move the object when the drive structure is energized. The drive structure has a rotating component. Plural braking magnets are closely spaced from the rotating member for generating pulses when the rotating member rotates past the magnets. At least one coil is juxtaposed with the magnets for sensing the pulses to output a signal representative at least of a direction of rotation.

In still another aspect, a method for operating an object that can be moved between a first configuration and a second configuration is disclosed. The method includes providing a drive structure and coupling the drive structure to the object such that the object is moved when the drive structure is energized. The method also includes closely juxtaposing plural magnets with the drive structure, using the magnets to brake the drive structure when the drive structure is not energized, and sensing signals generated when the drive structure rotates past the magnets to determine at least one of: a position of the drive structure, a velocity of rotation, and a direction of motion of the drive structure.

The details of the present invention, both as to its construction and operation, can best be understood in reference to the accompanying drawings, in which like numerals refer to like parts, and which:

BRIEF DESCRIPTION OF THE DRAWINGS

FIG. 4 is a side view of an alternate encoder assembly; and

FIG. 5 shows various graphs of signals that are derived from the assembly shown in FIG. 4.

DETAILED DESCRIPTION OF THE PREFERRED EMBODIMENT

Figure 1:
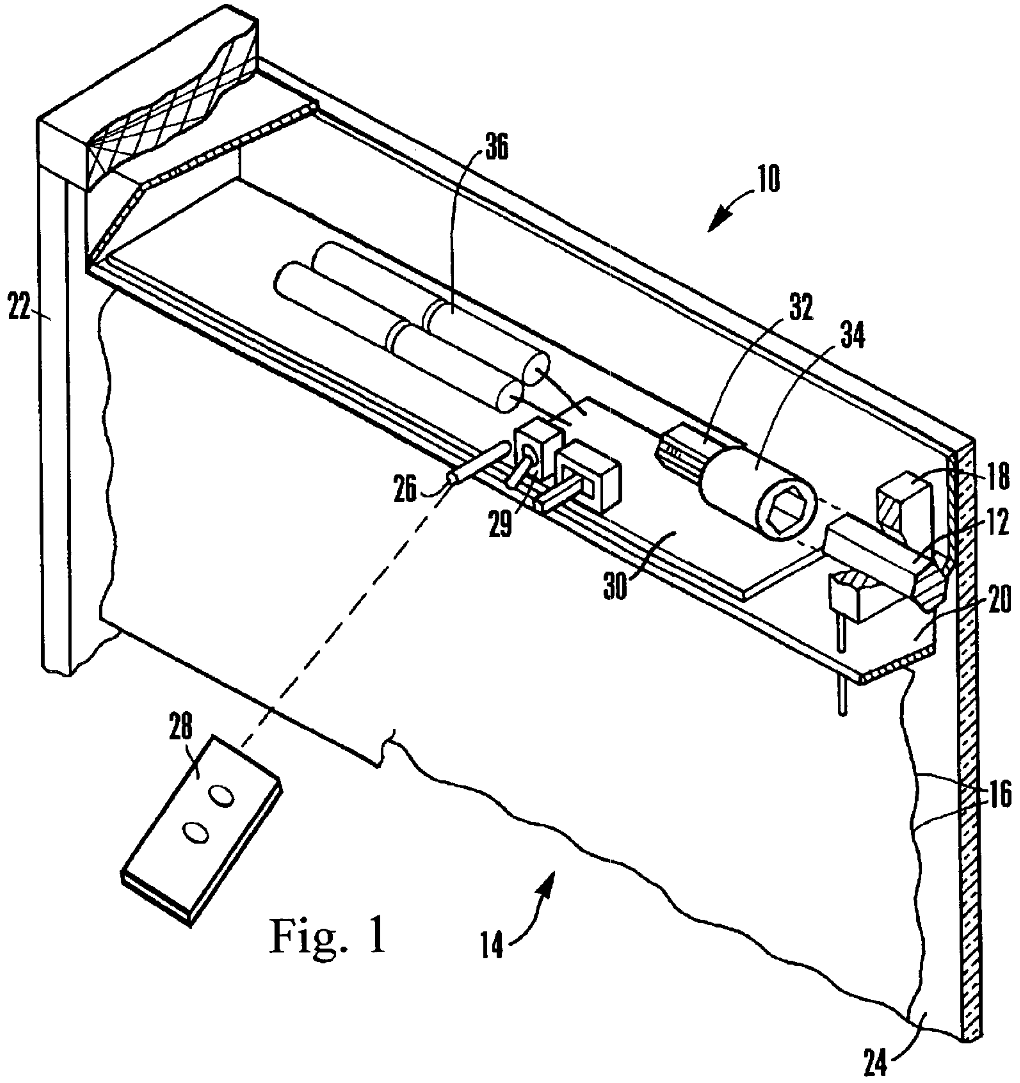
FIG. 1 is a perspective view of a window covering actuator, shown in one intended environment, with portions of the head rail cut away.

Referring initially to FIG. 1, a motorized window covering is shown, generally designated 10, that includes an actuator such as a rotatable rod 12 of a window covering 14, such as but not limited to a shade assembly having raisable (by rolling up) and lowerable (by rolling down, or unrolling) shade 16. As shown, the tilt rod 12 is rotatably mounted by means of a block 18 in a head rail 20 of the window covering 14.

While a roll-up shade is shown, it is to be understood that the principles herein apply to a wide range of window coverings and other objects that are to be moved by motors.

For example, the invention applies to raisable and lowerable pleated shades and cellular shades such as those commonly marketed under the trade names “Silhouette”, “Shangri-La”, etc. as well as to projector screens, awnings, etc. that can be raised and lowered. Moreover, while needed less in applications that require only tilting slats such as in horizontal blinds, the invention may also apply to these systems. Thus, for example, the rod 12 may be a roll-up rod of a shade, awning, or projector screen, or a tilt rod of a horizontal (or vertical) blind, or other like operator. It is thus to be further understood that the principles of the present invention apply to a wide range of window coverings and other objects including, but not limited to the following: vertical blinds, fold-up pleated shades, roll-up shades, cellular shades, skylight covers, etc. Powered versions of such shades are disclosed in U.S. Pat. No. 6,433,498, incorporated herein by reference.

In the non-limiting illustrative embodiment shown, the window covering 14 is mounted on a window frame 22 to cover a window 24, and the rod 12 is rotatable about its longitudinal axis. The rod 12 can engage a user-manipulable baton (not shown). When the rod 12 is rotated about its longitudinal axis, the shade 16 raises or lowers between an open configuration and a closed configuration.

FIG. 1 shows that the actuator 10 can include a control signal generator, preferably a signal sensor 26, for receiving a user command signal. Preferably, the user command signal is generated by a hand-held user command signal generator 28, which can be an infrared (IR) remote-control unit or a radio frequency (RF) remote-control unit. Or, the user command signal may be generated by any other means of communication well known in the art, such as by manipulable manual switches 29. The user command signals can include open, close, raise, lower, and so on.

An electronic circuit board 30 can be positioned in the head rail 20 and can be fastened to the head rail 20, e.g., by screws (not shown) or other well-known method. The preferred electronic circuit board 30 includes a microprocessor for processing the control signals. Also, the circuit board 30 includes appropriate signal conditioning circuitry that is electrically connected to the below-disclosed pickup coils for processing signals from the coils and sending the signals to the processor on the circuit board 30 for determining the position and/or speed and/or direction of rotation of the below-described motor as set forth further below.

Indeed, FIG. 1 shows that a small, lightweight electric motor/encoder 32 is coupled to a gear enclosure 34, preferably by bolting the motor 32/encoder to the gear enclosure 34. The gear enclosure 34 is keyed to the rod 12, so that as the gears in the gear enclosure 34 turn, the rod 12 rotates.

It is to be understood that the motor/encoder 32 is electrically connected to the circuit board 30. To power the motor/encoder 32, one or more (four shown in FIG. 1) primary dc batteries 36, such as type AA alkaline batteries or Lithium batteries, can be mounted in the head rail 20 and connected to the circuit board 30. Preferably, the batteries 36 are the sole source of power for the motor, although the present invention can also be applied to powered shades and other objects that are energized from the public ac power grid.

As set forth in the above-referenced U.S. Patent, a user can manipulate the signal generator 28 to generate a signal that is sensed by the signal sensor 26 and sent to signal processing circuitry in the circuit board 30. In turn, the electrical path between the batteries 34 and the motor/encoder 32 is closed to energize the motor 32 and move the window covering open or closed in accordance with the signal generated by the signal generator 28, under control of the processor on the electronic circuit board 30. As set forth further below, as the motor turns, the encoder portion generates a signal representative of the speed, direction, and position of the motor. When the motor is deenergized, the encoder portion advantageously brakes the motor from turning under the weight of the window covering 14.

Figure 2:
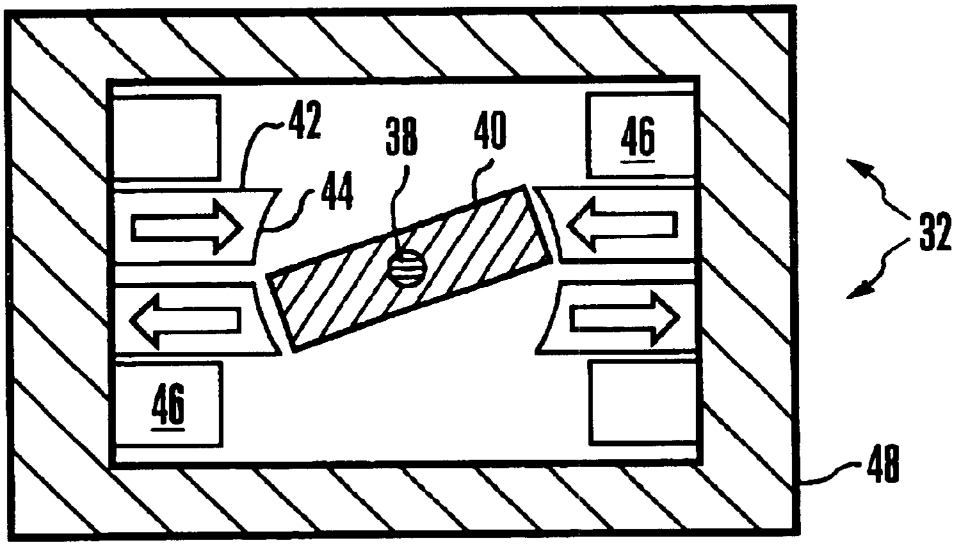
FIG. 2 is an end view of a first embodiment of the encoder assembly, with the rotating bar disposed between four magnets that are in the plane of rotation.

Now referring to FIG. 2, in one non-limiting implementation the motor/encoder 32 includes a motor rotor 38 that is press fit or otherwise stationarily engaged with an elongated ferromagnetic bar 40. Thus, the bar 40 rotates in a plane of rotation when the motor is energized. The bar 40 may be made of soft or powdered iron. If desired, a respective sector of a cylinder may be placed at each end of the bar 40 to decrease the air gap between the bar 40 and the ends of the below-described magnets.

With more specificity, disposed in the plane of rotation of the bar 40 are plural, preferably four, permanent magnets 42 that can have curved faces 44 as shown facing the bar 40 to minimize the air gap therebetween. In non-limiting embodiments the magnets 42 may be cylindrical in shape, about three millimeters in diameter. The arrows represent magnetic flux lines. Two wire coils 46 that may be connected together in series surround the magnets 42. The magnets 42 and coils 46 may be contained in a hollow enclosure 48 that can be made of soft Iron or powdered Iron.

It may now be appreciated that as the rotor 38 and bar 40 rotate, pulses are generated in the magnets 42, and the coils 46 pick up electric signals as the lines of magnetic flux pass through the coils 46. As mentioned above, to maximize the signal strength, the two coils 46 can be connected in such a manner that their signals are additive. The coils 46 may be wound on respective bobbins (not shown) that can be designed to fit snugly around the magnets 42.

When the rotating bar 40 is vertical (looking down on FIG. 2), the signal from the coils 46 is zero. As the bar 40 rotates in a clockwise direction, the ends of the bar simultaneously approach a south pole of one of the magnets 42 on the left end of the bar and a north pole of another magnet on the right end of the bar, reducing the average permeability of the magnetic path, in turn generating a positive-going signal as shown in the top waveform 50 of FIG. 3. When the bar 40 reaches the position shown in FIG. 2, the flux is at a maximum and the change in flux is at a minimum so the voltage is again zero. This occurs at the downward axis crossing 51 of the waveform 50. As the bar 40 reaches the horizontal position, the change in flux is at a maximum, but in the opposite direction of the original buildup, so the voltage is at a peak 52 in the negative direction. When the left face of the bar 40 is opposite the north pole, the flux is again at a maximum, but in the opposite direction, so the change in flux is at a minimum, and the output signal is zero. This occurs at the upward axis crossing 54 of the waveform 50. As the left face of the bar leaves the vicinity of the north pole, the flux, which was at a maximum, drops to zero, creating the second positive peak 56 in the signal. This sequence is repeated every 180°.

The area under these peaks is a constant regardless of speed, and consequently their amplitude is proportional to the speed of the motor, so long as the magnetic properties of the iron will support the frequencies of the signal. In this way, by integration, signals where the amplitudes of the peaks are constant are created. By measuring the time between like points on the pulse, the speed of rotation can be determined. By observing two smaller positive peaks sandwiching the large negative peak, the direction of motion (clockwise) can be inferred. Using an up/down counter that has been set to zero at a known point of reference, e.g., at a known position of the window covering, counting UP at every positive peak, large and small, and similarly counting DOWN at every negative peak, the value present in the counter at any given instance represents the distance from the reference point, with each increment representing motor rotation of 180°. Negative values in the counter indicate that the movement has been in the CCW direction, while positive values indicate CW motion.

If the motor is operated in the counterclockwise (CCW) direction, the left face of the bar first approaches a north pole instead of a south pole, so the initial signal is negative, as shown in the lower waveform 58, and a waveform like that in the upper waveform diagram is repeated, but with the polarity of the signal inverted to facilitate inferring a direction of counterclockwise. Rotations in the CCW direction can be subtracted from those previously counted in the CW direction to maintain the position of the motor and, hence, of the window covering 14.

This general form of electrical and magnetic structure can be produced in many forms. For example, a single magnet with the magnet oriented north pole upward can replace two adjacent magnets in FIG. 2. By "adjacent magnets" is meant two magnets that are on the same side of the rotor 38 as each other. Or, at the expense of signal strength, a single coil 46 may be used. Again, at the expense of signal strength, one pair of magnets could be replaced by soft or powdered iron. Size is not important, but larger structures will improve signal strength. Other ferromagnetic materials than soft or powdered iron may be used.

Now referring to FIG. 4, an alternate motor encoder 100 includes a rotating bar 102 press fit or otherwise attached to a motor rotor 104. The bar 102 in FIG. 4 may have the same shape as the bar 40 in FIG. 2, but because a long side 106 of the bar 102, not its ends, faces magnets 108, the bar 102 can have flat ends as shown with a small air gap being established between the bar 102 and magnets 108. The magnets 108 can be simple solid cylinders with no curvature on their ends. Another advantage of the configuration shown in FIG. 4 is that the rotor 104 of the motor can be relatively shorter, placing less stress on the motor bearings. Also, because the bar 102 is very close to the motor housing 110, balancing the bar is less critical.

In the embodiment shown in FIG. 4, two magnets 108 are mounted on a first bobbin 112 opposite each other relative to the bobbin 112, and two other magnets 108 are mounted on a second bobbin 114 opposite each other relative to the bobbin 114. The bobbins are disposed in tandem to each other. A respective wire pickup coil 116, 118 is wound around the core of each bobbin 112, 114. A keeper 120 can be provided to complete the magnetic circuit and to hold the magnets 108 onto the bobbins 112, 114.

With the above combination of structure, the motor/encoder 100 shown in FIG. 4 can be made smaller, better facilitating mounting within the head rail of a window covering, since the two bobbins 112, 114 are slightly smaller than the motor housing 110 itself. The mounting is easier since the only critical dimension is axial relative to the rotor 104.

In any of the configurations noted above, there is some braking action provided by the magnets. The preferred position of the bar is where the greatest amount of flux passes through the bar, which is the position of least energy (with the bar horizontal in FIG. 2, and vertical in FIG. 4). As the bar is pulled away from this position of least energy by the weight of the shade or other external force, the attraction to the preferred position increases, and if the external force divided by the gear ratio is less than the force of attraction plus friction, the motion of the motor will stop. The strength of the magnetic field determines the amount of braking that will be developed, which is one reason that four magnets are used.

There is also a quasi-stable position 90° from the preferred position where to motor will occasionally stop. Since in this position, the magnetic field is quite weak, little or no braking action occurs until the motor turns to place the bar near a preferred position.

Figure 3:
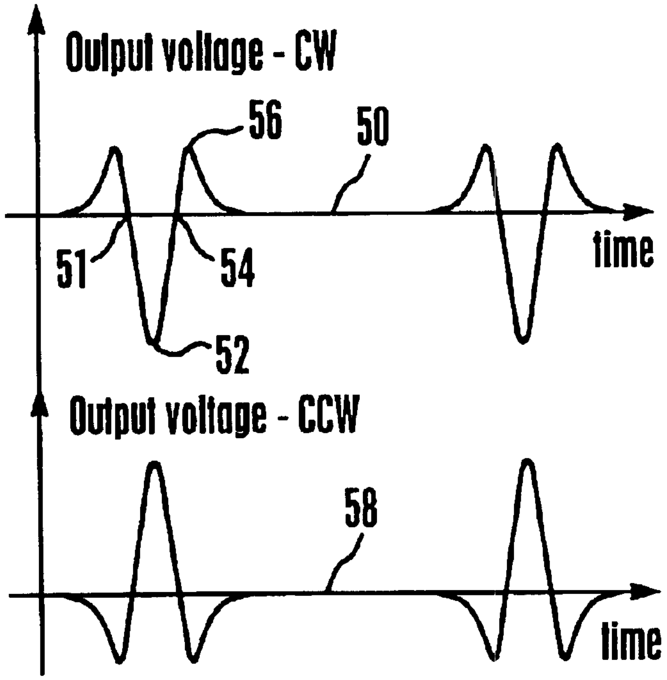
FIG. 3 shows graphs of the signals generated by the rotating bar when rotating clockwise and counterclockwise.

Now referring to FIG. 5, the two top waveforms 122, 124 are identical to the waveforms 50, 58 in FIG. 3, i.e., the waveforms 122, 124 represent CW and CCW motion of the motor. The third and fourth waveforms 126, 128 respectively depict the result of passing the two top waveforms 122, 124 through an integrator. Because the two top waveforms 122, 124 vary in duration inversely proportional to speed (and, hence, speed of rotation is known by determining the duration of the waveform), and the amplitude is proportional to speed, the amplitude of the output from the integrator is constant. This signal may be integrated a second time to produce respective fifth and sixth waveforms 130, 132, which are unipolar, the polarity depending only on the direction of the motor as shown. At this point, the signal amplitude is inversely proportional to speed, so the integrators must be designed to produce a signal of sufficient amplitude at the fastest speed. These signals are used to activate the comparator signals 134, 136 shown on the seventh and eighth waveforms 138, 140 in FIG. 5. One of the comparators produces two positive pulses as UP clocks per motor revolution when the motor is running clockwise. The other comparator produces two positive pulses as DOWN clocks per motor revolution when the motor is running counter-clockwise. In this way, the total number of rotations is known. Thus, in accordance with principles set forth above, from these two clocks, motor speed and position can be accurately determined, eliminating the need for a quadrature encoder. And, by observing which waveform 122, 124 obtains, the direction of rotation is known.

While the particular MAGNETIC ENCODER FOR POWERED WINDOW COVERING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims.

No claim element herein is to be construed under the provisions of 35 U.S.C. section 112, sixth paragraph, unless the element is expressly recited using the phrase "means for."

What is claimed is:

1. A powered assembly, comprising:

at least one object that can be moved between a first configuration and a second configuration, the object being selected from the group consisting of window coverings, awnings, skylight coverings, curtains, and screens, the object having a head rail;

at least one enclosure in the head rail;

at least one motor in the enclosure;

at least one actuator coupled to the motor and the object to move the object when the motor is energized, the motor turning a rotating member; and plural permanent magnets configured for fitting within the enclosure and juxtaposed with the rotating member and magnetically coupled thereto to output signals when the rotating member rotates useful in determining at least one of: a position, and a direction of rotation, of the motor, the magnets magnetically braking the rotating member from turning when the motor is deenergized.

2. The assembly of claim 1, comprising at least one pickup coil juxtaposed with the rotating member for generating pulses as the rotating member rotates past the magnets.

3. The powered assembly of claim 1, wherein the motor is powered by at least one dc battery.

4. The powered assembly of claim 2, wherein the object is a window covering.

5. The powered assembly of claim 2, wherein the rotating member includes an elongated ferromagnetic element coupled to a rotor of the motor to rotate when the rotor rotates.

6. The powered assembly of claim 5, wherein the ferromagnetic element rotates in a plane and the magnets are disposed in the plane.

7. The powered assembly of claim 6, comprising four magnets.

8. The powered assembly of claim 7, comprising two cylindrical bobbins, each holding two magnets in close juxtaposition with the ferromagnetic element.

9. The powered assembly of claim 8, wherein the north pole of one of the magnets of one bobbin is oriented toward the rotating member whereas the south pole of one magnet of the opposite bobbin is oriented toward the rotating member.

10. The powered assembly of claim 9, comprising respective wire wound around each respective bobbin to establish respective pickup coils, the pickup coils being connected together in series.

11. The powered assembly of claim 5, wherein the ferromagnetic element rotates an a plane and at least some magnets are disposed in the plane, the ferromagnetic element being elongated in a transverse dimension relative to the axis of rotation of the rotating element.

12. A drive assembly for a movable object including a rod, comprising:

an electrically-powered drive structure couplable to the rod to move the object when the drive structure is energized, the drive structure having a rotating member, the rotating member including a ferromagnetic element coupled to a rotor of the drive structure, the ferromagnetic element being elongated in the transverse dimension relative to the axis of rotation of the rotor;

plural braking magnets closely spaced from the rotating member and generating pulses when the rotating member rotates past the magnets; and at least one coil juxtaposed with the magnets and sensing the pulses to output a signal representative at least of a direction of rotation.

13. The assembly of claim 12, wherein the drive structure is powered by at least one dc battery.

14. The assembly of claim 13, wherein the object is selected from the group consisting of window coverings, awnings, skylight coverings, contains, and screens.

15. The assembly of claim 12, wherein the magnets are magnetically coupled to the rotating member sufficiently to stop the rotating member from rotating when the drive structure is deenergized.

16. The drive assembly of claim 12, wherein at least one magnet has a curved surface facing the elongated ferromagnetic element.

17. The drive assembly of claim 16, wherein the ferromagnetic element rotates in a plane and the magnets are closely spaced from the plane.

18. The drive assembly of claim 17, comprising four magnets.

19. The drive assembly of claim 18, comprising two bobbins, each holding two magnets in close juxtaposition with the ferromagnetic element.

20. The drive assembly of claim 19, wherein the bobbins are oriented in tandem with each other.

21. The drive assembly of claim 20, comprising respective wire wound around each respective bobbin to establish respective pickup coils, the pickup coils being connected together in series.

22. The drive assembly of claim 16, wherein the ferromagnetic element rotates in a plane and at least some magnets are disposed in the plane.

23. A method for operating an object that can be moved between a first configuration and a second configuration, the object being selected from the group consisting of window coverings, awnings, skylight coverings, curtains, and screens, the method comprising:

providing a drive structure;

coupling the drive structure to the object Such that the object is moved when the drive structure is energized;

closely juxtaposing plural magnets with the drive structure, the number and size of the magnets being established to brake the drive structure, when deenergized, from turning under the weight of the object;

using the magnets to brake the drive structure when the drive structure is not energized; and sensing signals generated when the drive structure rotates past the magnets to determine at least one of: a position of the drive structure, and a direction of motion of the drive structure.

* * * * *